(12) United States Patent
Koelliker

(10) Patent No.: US 6,812,293 B1
(45) Date of Patent: Nov. 2, 2004

(54) REDISPERSIBLE MATERIAL, PROCESS FOR PRODUCING AND USING THE SAME, AND AQUEOUS SYSTEM CONTAINING THIS REDISPERSIBLE MATERIAL

(75) Inventor: Robert Koelliker, Oberkirch (CH)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/830,974

(22) PCT Filed: Nov. 2, 1999

(86) PCT No.: PCT/EP99/08370

§ 371 (c)(1),
(2), (4) Date: Feb. 7, 2002

(87) PCT Pub. No.: WO00/26263

PCT Pub. Date: May 11, 2000

(30) Foreign Application Priority Data

Nov. 3, 1998 (DE) .......................................... 198 50 658

(51) Int. Cl.$^7$ ................................................. C08F 8/14
(52) U.S. Cl. .................... 525/326.5; 524/588; 525/384; 526/279
(58) Field of Search .............................. 525/326.5, 384; 526/279; 524/588

(56) References Cited

U.S. PATENT DOCUMENTS

| | | | |
|---|---|---|---|
| 4,618,650 A | | 10/1986 | Halasa et al. ................ 525/105 |
| 5,344,890 A | * | 9/1994 | Miyazono et al. ........ 525/326.5 |
| 5,486,565 A | * | 1/1996 | Gentle et al. ................ 524/730 |
| 5,753,733 A | | 5/1998 | Eck et al. |

FOREIGN PATENT DOCUMENTS

| | | |
|---|---|---|
| DE | 44 02 408 | 8/1995 |
| EP | 0 187 040 | 7/1986 |
| EP | 0 203 391 | 12/1986 |
| EP | 0 212 125 | 3/1987 |
| EP | 0 449 413 | 10/1991 |
| EP | 0 818 496 | 1/1998 |
| GB | 2 192 891 | 1/1988 |
| WO | WO 85 04891 | 11/1985 |

OTHER PUBLICATIONS

English abstract of German Patent No. 44 02 408.

English equivalent of German Patent No. 44 02 408; US patent No. 5,753,733 Issued May 19, 1998.

* cited by examiner

*Primary Examiner*—Bernard Lipman
(74) *Attorney, Agent, or Firm*—Charles W. Almer

(57) ABSTRACT

The object of the invention is a redispersible material, particularly in powder form, which comprises a polymer containing silanol groups, the latter being provided with a protective group. The redispersible material can be in the form of a redispersible powder, an aqueous dispersion or an aqueous solution. The invention also makes available a process for the preparation of a redispersible material by reacting a silanol group-containing polymer with a compound having a protective function for the silanol groups, optionally with the subsequent recovery of a redispersible, pulverulent material from the polymer provided with the protective groups. The invention also relates to the use of the redispersible material in adhesives, plastic-containing, cement-bound systems, plastic-bound, cement-free binders, wallpaper pastes, disperse dyes, glass fibre composite systems, etc. The invention is characterized in that the silanol groups in a random polymer can be temporarily protected and consequently the reactivity of these groups cannot be blocked by undesired reactions. In addition, the latently present silanols can be released in planned manner in connection with the final applications.

2 Claims, No Drawings

REDISPERSIBLE MATERIAL, PROCESS FOR PRODUCING AND USING THE SAME, AND AQUEOUS SYSTEM CONTAINING THIS REDISPERSIBLE MATERIAL

FIELD OF THE INVENTION

The present invention relates to a redispersible material, particularly in powder form, a process for its production and its use, as well as an aqueous system containing the redispersible material.

BACKGROUND OF THE INVENTION

It is known from the prior art to stabilize aqueous polymer dispersions (latices), which do not in themselves represent thermodynamically stable systems, by dispersants, such as protective colloids or emulsifiers. Apart from the stabilized, aqueous polymer dispersions, interest is also attached to powders obtainable by drying which, due to their characteristics, such as easy handling, easy storage and transportation, as well as easy dosability, are gaining increasing significance.

Such systems can be adapted to the necessary final applications by the targeted choice of functional groups, which for this purpose can be introduced into the polymers used. Numerous such functional groups are known. Due co their reactions, increasing significance is being attached to polymer compositions containing organosilicon groups. For example, EP 187 040 A2 describes a modified polyolefin, which contains a silane or alkoxysilane in copolymerized, grafted or chemically bound form, which is in turn bound to polyvinyl alcohol. The modified polyolefin is used in multilayer films and as an emulsion polymer in polymer blends. A similar product is described by WO 85/4891, i.e. a modified alcohol in the form of a NAD stabilizer (non aqueous dispersant, generally a polyol, which contains unsaturated groups and which is used for stabilizing a further polymer, in that it prevents its agglomeration in steric manner), said alcohol resulting from the reaction of an alcohol with an olefinically unsaturated silicon-containing compound. Thus, with the silane are formed Si—O—C-bonds, which are not reversibly soluble. Thus, the silanes are exclusively used as coupling agents, the characteristics of the free silane groups playing no part. A preparation of redispersible powders with the polymers described is not possible and not intended.

Redispersible powders based on polymers containing silicon groups are also known from the prior art. For example, EP 754 737 B describes coating compositions, based on a redispersible powder, which contains water-soluble polymer and organosilicon compounds with a specific viscosity and a specific molecular weight. The coating composition is used on metal, wood, plastics and mineral substrates, such as cement concrete, natural stone, sandy limestone, etc. DE 195 26 759 relates to crosslinkable powders redispersible in water, based on ethylenically unsaturated monomers, such as vinyl esters with 1 to 18 carbon atoms, optionally branched alkyl carboxylic acids, (meth) acrylic esters with 1 to 18 carbon atoms, optionally branched alcohols, olefins, dienes, vinyl aromatics and/or vinyl halides, as well as 0.05 to 15.0 wt. % of one or more unsaturated silicon compounds, based on the total monomer mixture.

According to EP 228 657 B1 redispersible powders containing at least one organic silicon compound are prepared, which contain at least 30 wt. % organic silicon compound and at least 50 wt. % have a boiling point of at least 150° C. at 1020 hPa, on average max 1.8 SiC-bound, organic groups per silicon atom and per molecule at least one Si—H—, Si—OH— or at least one Si—O—R-group, in which R can be substituted by an alkoxy group, as well as 5 to 50 wt. % water-soluble polymers, based on the total weight of the organic silicon compound. The powder is prepared by spray drying in known manner. Prior to spraying further additives can be added, such as solvents, emulsifiers, antifoaming agents, dyes, pigments, fillers, etc. A reversible reaction with the silicon-containing groups is not described.

WO 95/20626 describes water-redispersible dispersion powder compositions based on water-insoluble polymers and one or more organosilicon compounds. Preparation takes place by the emulsion polymerization of one or more monomers in the presence of one or more water-dispersible organosilicon compounds and spray drying the products obtained, optionally before or after the addition of additives, such as protective colloids and anti-blocking agents. As suitable protective colloids are mentioned polyvinyl alcohols, their derivatives, polysaccharides in water-soluble form, such as starch, cellulose, proteins, synthetic polymers, etc. and as antiblocking agents calcium or magnesium carbonate, talc, gypsum, silica and silicates. The protective colloid in the form of polyvinyl alcohol is only optionally added. Spray drying can alternatively take place before or after polyvinyl alcohol addition and the polyvinyl alcohol exclusively fulfils the function of a protective colloid. The prerequisites for a reaction of the silicon-containing group with the polyvinyl alcohol, accompanied by the formation of a reversibly soluble bond do not exist and this is also not intended.

WO 95/20627 of Wacker-Chemie GmbH with the same application date as WO 95/20626 describes substantially the same redispersible powders. However, the aqueous organopolymer dispersion and the aqueous dispersion of the silicon compound are either jointly sprayed and dried or separately sprayed and jointly dried. Here again, prior to spraying and drying, adjuvants can be optionally added.

As is known, in the aforementioned organosilicon polymers, no matter whether they are redispersible powders or in some other administration form, the silicon groups present should react with inorganic substrates, such as glass, wood, sand; cement-containing materials or similar substrates. Copolymerizable oxysilanes, as are typically present in a polymer, under conventional reaction conditions hydrolyze within minutes to the reactive silanols. This is represented by the following reaction equation (1):

polymer-Si—OR+H$_2$O→polymer-Si—OH+ROH          (1)

As inorganic SiO$_2$ containing materials, such as cement, mortar and glass, to a certain extent have latent Si—OH-groups, silane-modified latices can form covalent, irreversible bonds with the inorganic material. This leads to improved characteristics with respect to adhesion or flexibility, i.e. the setting behaviour and processability of the end products. Such a reaction of a polymer containing silanol groups with an inorganic matrix, which has latent Si—OH-groups, is reproduced by the following reaction equation (2):

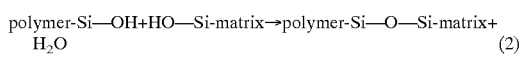

polymer-Si—OH+HO—Si-matrix→polymer-Si—O—Si-matrix+ H$_2$O          (2)

It is directly clear from reaction equation (2), that the polymers containing the silanol groups also react with one another in the aqueous system and, accompanied by dehydration the following reaction equation (3) occurs:

polymer-Si—OH+HO—Si-polymer→polymer-Si—O—Si-polymer+H₂O  (3)

Equation (3) represents an undesired secondary reaction of the silanol groups, which competes with the intended reaction according to reaction equation (2). No soluble bonds are formed, so that the silanol groups obtained lose their activity and are no more available for the reaction. Thus, the polymer particles are irreversibly crosslinked by the formation of Si—O—Si-bonds. In order to prevent such a reaction, i.e. an irreversible bond formation, in the prior art either no Si—OH-groups are used in the polymer material or in planned manner compounds are selected, which cannot enter into such reactions and which are consequently hydrolysis-stable under the reaction conditions. However, such silicon group-containing polymers have for the final applications a generally significantly reduced reactivity (cf. reaction equation (2)), so that more aggressive reaction conditions are needed or the desired coupling reactions of the silanols with the matrix materials, such as with cement-containing products and the like, only occur to an inadequate extent.

This becomes more important when transforming the polymer materials into redispersible powders where the above-described secondary reaction (reaction equation (3)) becomes the main reaction during the preparation of redispersible powders by removing water, e.g. by spray drying Therefore the problem of the invention is to make available polymers containing silanol to functionalities, in which the silanol groups in aqueous systems are not to be deactivated by the formation of irreversible bonds and consequently have advantageous or, in certain cases, improved characteristics with respect to their final uses, such as e.g. in plastic-containing, cementbound systems and as a result of the desired following reactions lead to improved use products. In addition, a high concentration of such silanol groups in the polymer must be possible. In addition, both aqueous dispersions and redispersible powders must be obtainable from the silanol group-containing polymers, without there being a deactivation following redispersion. The choice of polymer starting materials must also be of a flexible nature.

SUMMARY OF THE INVENTION

According to the invention the above problem is solved by a redispersible material, particularly in powder form, which comprises a polymer containing silanol groups, which are provided with a protective group.

Thus, by protecting the silanol groups contained in a polymer a premature deactivation by irreversible bond formation is prevented. The protective group blocks the active centres in the form of silanol groups temporarily against the attack of reagents, such as e.g. further silanol groups, so that reactions such as oxidation, reduction, substitution, condensation, etc. cannot take place. Such functional groups made temporarily non-reactive by a protective group are also known as "latent" groups.

DESCRIPTION OF THE INVENTION

According to the invention the polymer is not restricted, provided that it contains silanol groups. The term "polymer" covers homopolymers, copolymers, block polymers, graft polymers and oligomers. It is clear that numerous (co) polymerizable starting monomers can satisfy the requirements for the production of these polymers. In exemplified manner reference is made to vinyl ester homo- or copolymers, (meth)acrylate homo- or copolymers, homo- or copolymers of dienes, vinyl aromatics, vinyl halogen compounds, fumaric and/or maleic acid derivatives, as well as polyaddition and polycondensation polymers, such as polyurethanes, polyesters, polyethers, polyamides, epoxy resins, melamine formaldehyde resins, phenol formaldehyde resins, etc. This list does not claim to be complete and in particular represents no restriction of choice. In fact further monomers/polymers are usable and these are readily apparent to the expert. The polymer can be any random latex or also a solution polymer.

A usable protective group must be selectively introduceable and then removable again in a simple manner by reacting with the silanol groups. It can be any chemical group, which reacts reversibly with the silanol group. Preferably the protective group is attributed to a hydroxy group-containing compound, particularly a polyol. Within the scope of the invention the usable polyols are not particularly restricted. The term. "polyol" in particular covers a polyhydric alcohol, i.e. a random organic compound, which contains at least two alcoholic hydroxy groups in the molecule. These e.g. include diols, such as 1,5-pentane diol, 2-methyl-1.4-butane diol, 2.2-dimethyl-1.3-propane diol, 2,5-dimethyl-3-hexine-2,5-diol, 1,10-decane diol, 2,2-bis-(4-hydroxycyclohexyl)-propane, 1,6-hexane diol, glycols such as glycol, neopentyl glycol, polyethylene glycol or polyether glycol, triols, such as 1,2,4-butane triol, trimethylol propane, trimethylol ethane, glycerol or also tetrahydric alcohols (tetritols), such as threitol, erythritol, mesoerytritol and pentaerythritol (tetra-methylol ethane). Obviously the polyols used according to the invention can also be so-called sugar alcohols, i.e. polyhydroxy compounds resulting from the reduction of the carbonyl function, which are admittedly not sugars, but have a sweet taste. In exemplified manner reference is made to pentitols, such as arabitol, adonitol or xylitol, hexitols, such as sorbitol, inositol, mannitol or dulcitol (galactitol). It also covers sugars such as pentoses and hexoses, e.g. arabinose, ribose, xylose, lyxose, allose, altrose, glucose, mannose, idose, galactose, talose, fructose, etc. Preference is given to the use of polyols, which remain in the system after splitting off, so that an additional removal stage can be obviated. Preference is given to high molecular weight systems, particularly polyols, which simultaneously have a stabilizing action on a latex particle, such as e.g. polyvinyl alcohol acting as a protective colloid.

The invention also relates to an aqueous system containing the aforementioned redispersible material. They can be colloid-disperse systems, one phase (disperse phase) being dispersed in the other phase (dispersant). As a function of the degree of dispersal a distinction is made between coarse-disperse, colloid-disperse and molecularly disperse systems. It also covers molecularly disperse systems, which appear as completely clear liquids, i.e. so-called true solutions. It has been found that, independently of the form of the latent silanol group-containing polymer, in the form of a redispersible powder, a dispersion or a solution, stable systems are obtained, which are temporarily deactivated. In simple manner and with high yields it is then possible, independently of the chosen system, to bring about a splitting off of the protective group under specific conditions, e.g. by acid hydrolysis, hydrogenolysis, photolysis or some other process.

The invention also relates to a process for the preparation of a redispersible material, as described hereinbefore, by reacting a silanol group-containing polymer with a compound having a protective function for the silanol groups, optionally with the subsequent recovery of a redispersible, pulverulent material from the polymer provided with the protective groups.

Fundamentally, the starting material for the process according to the invention can be a random polymer with silanol groups and it is obvious that commercially available polymers can also be used. According to the process of the invention the silanol groups in the polymer are protected by reacting with a compound, which has a corresponding protective function for the Si—OH-group. According to a preferred embodiment use is made of a compound with at least one hydroxy group and preferably the aforementioned polyols are used for this purpose. Such reactions and the reaction conditions to be maintained are known to the expert. Thus, independently of the hydroxy compound chosen, the temperature, quantity and further reaction conditions can be determined and adjusted in simple manner.

In order to technically illustrate the process according to the invention, hereinafter the reaction of a triol group with a silanol group-containing polymer is shown by means of reaction equation (4):

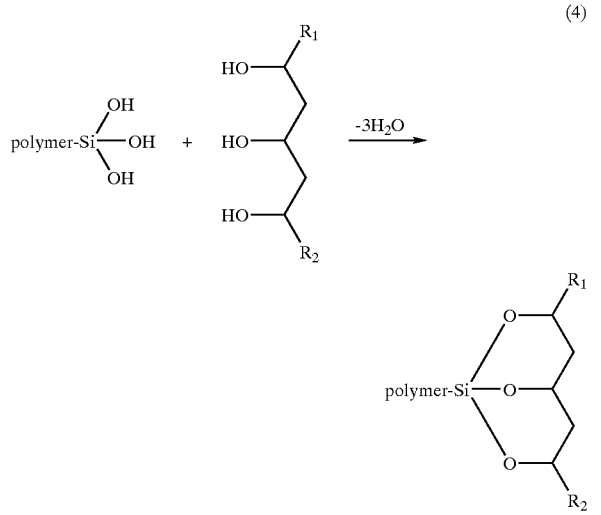

(4)

By dehydration in known manner a reversible bond is formed from the silanol group and the glycerol derivative and in the broadest sense the resulting compound can be called a tridentate chelate complex. Obviously, in the present case, it need not necessarily be a glycerol derivative, in which $R_1$ and $R_2$ in each case represent alkyl groups, but instead said compound can be any random organic compound with three hydroxy groups, e.g. a polyvinyl alcohol portion. This polymer with latent silanol groups is initially a stable compound, in which the bond formed can be split off again in simple manner. This takes place in the manner shown in reaction equation (5):

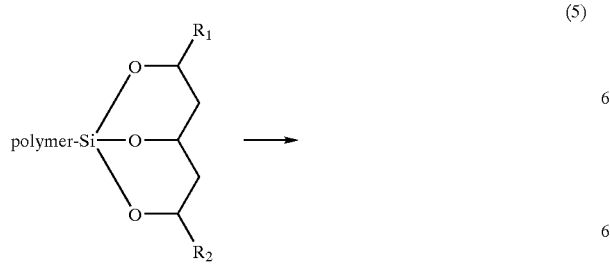

(5)

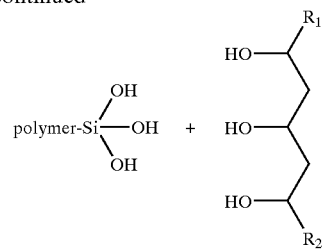

The above-shown release of the silanol groups by splitting off the triol group can be performed in conventional manner. This can e.g. take place by a corresponding change to the pH-value, either by adding a solid, such as a solid acid in the form of citric or oxalic acid, or a solid base, such as calcium hydroxide, sodium hydroxide or cement, or by corresponding matrix components in connection with the final use. As a result the reactive groups can be released in planned manner, without completely reacting beforehand by undesired reactions and thus remaining irreversibly blocked. Obviously not all the HO—Si-groups present in the polymer need be protected with a protective group. Using the process according to the invention there can also be a partial blocking, so that in planned manner silanol groups without a protective group remain in the polymer. In the case of a triol, there can e.g. be a quantitative reaction, i.e. 100% HO—Si- per HO—C-group is protected. In the case of a polyol, such as e.g. polyvinyl alcohol, there can e.g. be a suitable reaction up to 50% HO—Si- per HO—C-group (molar ratio).

The polymer with the protected silanol groups prepared according to the invention can be used in the form of an aqueous dispersion or solution. By removing the water in conventional manner by drying, particularly by spray or freeze drying, a redispersible powder can be obtained. A particularly advantageous process for drying the aqueous dispersion is spray drying, so that larger powder quantities can be produced. According thereto the aqueous dispersion is sprayed and dried in a hot air flow and preferably drying air and the sprayed, aqueous dispersion are passed in the same direction through the drier and, if necessary, known drying aids can be concomitantly used. The redispersible powder can be used as a pulverulent finished mixture, which only has to be mixed with water. As a function of the intended use it can be redispersed in water in a more or less concentrated form. As has already been described, there can be then a planned release of the silanol groups in the redispersed powder.

The inventive, redispersible material can be used in many different ways in the form of a redispersible powder, an aqueous dispersion or solution. Thus, it is suitable for use in composite and coating mortars, cement dyes and adhesives, in plastic-containing, cement-bound systems, particularly in mortars, and plastic-bound, cement-free binders, particularly in cement-free mortars, gypsum mortars, primers, plasters, carpet, wood, powder and floor adhesives, as well as in wallpaper pastes, disperse dyes and glass fibre composite systems.

Numerous different advantages result from the invention. The invention makes it possible to provide a redispersible material, which temporarily has deactivated silanol groups, which can be activated in a planned manner. This applies not only for aqueous systems, but also for the redispersible powders preparable from the material. Thus, very high contents of reactive silanol groups can be made available, which generally lead to improved characteristics of the end products, because significantly crosslinked systems can be obtained, which have a much better adhesion. In addition, the materials according to the invention have a surprising flexibility with respect to the quantitative and qualitative framework conditions compared with the aforementioned prior art. Through the provision of protected silanol groups it is possible to bring about a delayed reaction or crosslinking during the final application, which additionally improves handling and processing. Advantageously it is possible to make available polymers with a very high silanol group content, so that the desired characteristics become all the more obvious with increasing concentrations of the silanol groups present. Such high silanol concentrations have not hitherto been possible in the known polymers. The polymer with latent silanol groups can also be directly used and when using very small particle sizes they can directly serve as the primer. The redispersible material according to the invention also has very favourable characteristics, such as improved processability, better adhesion, higher flexibility, good water resistance and longer storage stability. It is also an advantage of the redispersible material, that generally improved characteristics occur in the indicated final applications.

The invention is described in greater detail hereinafter relative to examples, which do not restrict the teaching of the invention. Further examples are apparent to the expert within the scope of the inventive disclosure.

EXAMPLES

Example 1

61 g of polyvinyl alcohol (PVA) with a degree of hydrolysis of 88% and a viscosity of 5.7 mPas (as a 4% aqueous solution), dissolved in 791 g of water, and 7.5 g of sodium bicarbonate were added to a 2 liter glass reactor, equipped with a stirrer and a temperature control. This solution was thermostatically controlled to 70° C. This was followed by the addition of a first monomer mixture consisting of 38.2 g of buryl acrylate, 38.2 g of styrene and 3.05 g of gamma-methacryloxypropyl trimethoxysilane (Silane A-174 of Witco Corp.) and five minutes later 7.5 g of tert, buryl hydroperoxide (70% in water). Subsequently, for six hours, 4.5 g of sodium formaldehyde sulphoxylate (Rongalit C of BASF) were dosed into the reactor as a 10% aqueous solution. After 30 minutes 687.4 g of a second monomer mixture consisting of 343.7 g of butyl acrylate and 343.7 g of styrene, were dosed in continuously for 4½ hours. At the end of monomer dosing 2.1 g of tert, butyl hydroperoxide were added to the reaction mixture. Following a total reaction time of 7 hours the resulting dispersion was cooled and anaylzed. The solid material amounted to 49.2%, the pH-value was 8.1 and the viscosity 2820 mPas (according to Epprecht, cup D and stage 13).

Example 2

Example 1 was repeated and to the glass reactor were added 53.7 g of PVA, dissolved in 695 g of water, 6.6 g of sodium bicarbonate and 3.85 g of a surfactant mixture (nonionic/anionic, approx. 45% in water). The first monomer mixture consisting of 32.15 g of butyl acrylate, 32.15 g of styrene, 8.1 g of gamma-methacryloxypropyl triethoxysilane and 0.15 g of acrylic acid, was dosed in continuously for 1 hour. At the end of feed 6.6 g of tert, butyl hydroperoxide were added, followed by a 4¾ hour feed of 4.0 g of sodium formaldehyde sulphoxylate as a 10% aqueous solution. 30 minutes later the second monomer mixture, consisting of 302.0 g of butyl acrylate and 302.0 g of styrene, was fed in continuously for 3 hours. At the end of the second monomer feed 1.8 g of tert, buryl hydroperoxide were added and the temperature was raised to 85° C. Following a total reaction time of 6½ hours, the resulting dispersion was cooled and analyzed. The solid material amounted to 49.7%, the pH-value was 7.5 and the viscosity 2400 mPas (according to Epprecht, cup C and stage 13).

Example 3

Example 2 was repeated, the first monomer feed consisting of 33.3 g of butyl acrylate, 33.3 g of styrene, 5.4 g of gamma-methacryloxypropyl trimethoxy-silane and 0.15 g of acrylic acid. The solid material amounted to 50.0%, the pH-value was 7.4 and the viscosity 1730 mPas (according to Epprecht, cup C and stage 13).

Example 4

Example 2 was repeated, the first monomer feed consisting of 34.35 g of butyl acrylate, 34.35 g of styrene, 2.7 g of gamma-methacryloxypropyl tri-methoxysilane and 0.15 g of acrylic acid. The solid material amounted to 49.6%, the pH-value was 7.4 and the viscosity 1740 mPas (according to Epprecht, cup C and stage 13).

Example 5

Example 2 was repeated and to the glass reactor were added 44.5 g of PVA with a degree of hydrolysis of 98.4% and a viscosity of 3.7 in Pas (as a 4% aqueous solution), dissolved in 550 g of water and 5.6 g of sodium bicarbonate. This solution was thermostatically controlled to 80° C. The first monomer mixture consisting of 20.0 g of butyl acrylate, 19.9 g of styrene, 15.6 g of gamma-methacryloxypropyl trimethoxysilane and 0.11 g of acrylic acid were dosed in continuously for 1 hour. At the end of feed 11.1 g of tert, butyl hydroperoxide were added, followed by a 5¾ hour feed of 6.5 g of sodium formaldehyde sulphoxylate as a 10% aqueous solution. One hour later the second monomer mixture consisting of 247.7 g of butyl acrylate and 247.7 g of styrene was added continuously for 4 hours. At the end of the second monomer feed 3.0 g of tert, butyl hydroperoxide were added and the temperature raised to 90° C. After a total reaction time of 7¼ hours the resulting dispersion was cooled and analyzed. The solid material amounted to 47.7%, the pH-value was 7.4 and the viscosity 740 mPas (according to Epprecht, cup C and stage 13)

Example 6

Example 2 was repeated and to the glass reactor were added 44.2 g of PVA with a degree of hydrolysis of 98.4% and a viscosity of 3.7 mPas (as a 4% aqueous solution), dissolved in 551 g of water. This solution was thermostatically controlled to 75° C. The first monomer mixture consisting of 46.4 g of vinyl acetate and 8.3 g of vinyl trimethoxysilane (from Fluka) was dosed in continuously for 1 hour. At the end of feed 15.5 g of ten, butyl hydroperoxide were added, followed by a 4½ hour feed of 6.8 g of sodium formaldehyde sulphoxylate as a 10% aqueous solution. After 30 minutes the temperature was raised co 80° C. After a further 30 minutes the second monomer feed consisting of 110.4 g of buryl acrylate and 386.9 g of vinyl acetate was fed in continuously for 3 hours. At the end of the second monomer feed 4.0 g of tert, butyl hydroperoxide were added and the temperature raised to 90° C. After a total reaction time of 6¼ hours the resulting dispersion was cooled and analyzed (the solid material amounted to 48.9%, the pH-value was 2.4 and the viscosity 1020 mPas (according to Epprecht, cup C and stage 13).

Example 7

Comparison Example 1

Example 2 was repeated, but the first monomer feed only consisted of 36.2 g of butyl acrylate, 36.2 g of styrene and 0.15 g of acrylic acid. The solid material amounted to 50.0%, the pH-value was 7.4 and the viscosity 2010 mPas (according to Epprecht, cup C and stage 13).

Example 8

Use Example 1

Examples 2, 3, 4 and 7 were spray dried in conventional manner to a redispersible powder. The dispersion powders obtained were mixed in 8.5 parts with quartz sand 0.1–0.3 mm (57.7 parts), Portland cement CEM 1 152.5 (30.7 parts), calcium hydroxide (2.8 parts) and modified methyl hydroxyethyl cellulose with a viscosity of 6000 mPas (as 2% aqueous solution; 0.4 parts) and then mixed with water (21 parts). The mortar obtained was applied to a concrete slab and then clay tiles (5×5 cm) were placed in the mortar bed. It was ensured that the tiles projected 10 mm over the longitudinal edge of the concrete slab in order to measure the shear adhesive strengths. After 14 days under standard climatic conditions (23° C. and 50% relative atmospheric humidity) or 7 days under standard climatic conditions and 7 days storage in water the shear adhesive strengths were measured on the basis of DIN 53 265. The values obtained (table 1) clearly show that on increasing the silane content there is an increase both in the maximum force and the deformation.

TABLE 1

Shear adhesive strengths (maximum force and deformation) after dry and wet storage

| Disp. powder obtained from | Silane content (%) for 100 parts monomer | max force dry | deformation dry | max force wet | deformation wet |
|---|---|---|---|---|---|
| Ex. 2 | 1.2 | 6.2 kN | 0.30 mm | 1.22 kN | 0.11 mm |
| Ex. 3 | 0.8 | 4.5 kN | 0.23 mm | 0.64 kN | 0.06 mm |
| Ex. 4 | 0.4 | 5.2 kN | 0.23 mm | 0.67 kN | 0.07 mm |
| Ex. 7 | 0.0 | 2.3 kN | 0.20 mm | 0.27 kN | 0.05 mm |

Example 9

1:1 Ratio 172.5 g of a commercial, water-dispersed polymer with active silanol groups having a solids content of 29.0% (Kanebinol KD-20 of Nippon-NSC) were mixed with 250.0 g of polyvinyl alcohol (PVA, as a 20% aqueous solution) with a degree of hydrolysis of 88% and a viscosity of 5.7 mPas (as a 4% aqueous solution), and slightly stirred for 5 minutes. The polymer mixture was spray dried in conventional manner to a redispersible powder. This led to a white, free-flowing powder, which redispersed in water. The spray drying and also the following redispersion are comparable with commercial dispersion powders.

Example 10

2:1 Ratio

Example 9 was repeated and 230.0 g of commercial, water-dispersed polymer with active silanol groups with a solids content of 29.0%7 (Kanebinol KD-20 of Nippon-NSC) were mixed with 166.5 g of polyvinyl alcohol (PVA; as a 20% aqueous solution) and slightly stirred for 5 minutes. The polymer mixture was spray dried in conventional manner to a redispersible powder. This gave a white, free-flowing powder, which redispersed in water. The spray drying and also the following redispersion are comparable with commercial dispersion powders.

Example 11

3.45 g of a commercial, water-dispersed polymer with active silanol groups having a solids content of 29.0% (Kanebinol KD-20 of Nippon-NSC) were mixed with 5.0 g of polyvinyl alcohol (PVA; as a 20% aqueous solution) with a degree of hydrolysis of 88% and a viscosity of 5.7 mPas (as a 4% aqueous solution) and slightly stirred for 5 minutes. The polymer mixture (cloudy solution) was freeze dried. The resulting material was mixed with water and slightly stirred. Immediately the water again became cloudy, which indicates redispersion of the material. The same procedure was used with the unprotected, water-dispersed polymer, no protective group (e.g. polyvinyl alcohol) being added. The freeze dried material was also mixed with water and slightly stirred. However, the water remained clear, even after prolonged stirring and a longer time in the water. It can be concluded from this that during or after freeze drying the material crosslinked and formed a high molecular weight, water-insoluble polymer.

Example 12

Example 9 was repeated and 17.25 g of a commercial, water-dispersed polymer with active silanol groups and a solids content of 29.0% (Kanebinol KD-20 of Nippon-NSC) were mixed with 25.0 g of polyvinyl alcohol (PVA; as a 20% aqueous solution) and slightly stirred for 5 minutes. Then, 90.0 g (based on the solids content) of a dispersion conventionally used for dispersion powder production (based on ethylene-vinyl acetate) were added and adjusted with water to a solids content of 25%. Then slight stirring again took place for 5 minutes. The polymer mixture was spray dried in conventional manner to a redispersible powder. This led to a white, free-flowing powder, which redispersed in water. The spray drying and subsequent redispersion are comparable with commercial dispersion powders.

Example 13

Example 12 was repeated, but only 45.0 g of polyvinyl alcohol and 91.0 g of dispersion (based on the solids content) were mixed and diluted with water to a solids content of 25%. After stirring for 5 minutes the polymer mixture was spray dried in the conventional manner to a redispersible powder. This led to a white, free-flowing powder, which redispersed in water.

Example 14

Use Example 2

Examples 9, 10, 12 and 13 were mixed in each case 5 parts with quartz sand 0.1–0.3 mm (38.8 parts), Portland cement CEM I 52.5 (33.8 parts), calcium carbonate (21.7 parts), cellulose fibres (0.5 parts) and methyl hydroxyethyl cellulose with a viscosity of 2000 mPas (as a 2% aqueous solution; 0.5 parts) and then mixed with water (20 to 21 parts). The mortar obtained was applied to a concrete slab and then clay tiles (5×5 cm) were placed in the motar bed. After 28 days under standard climatic conditions (23° C. and 50% relative atmospheric humidity) or 7 days under standard climatic conditions and 21 days storage in water, the adhesive tensile strengths were measured on the basis of prEN 1348 (October 1993). The values obtained (table 2) clearly show that with the silane/PVOH system improved adhesive tensile strengths were obtained when compared with the other systems.

TABLE 2

Adhesive tensile strengths after dry and wet storage

| Disp. powder | dry | wet |
| --- | --- | --- |
| Ex. 9 | 1.00 N/mm$^2$ | 0.51 N/mm$^2$ |
| Ex. 12 | 1.40 N/mm$^2$ | 0.35 N/mm$^2$ |
| Ex. 13 | 1.07 N/mm$^2$ | 0.28 N/mm$^2$ |
| KD20 | 0.16 N/mm$^2$ | 0.04 N/mm$^2$ |

What is claimed is:

1. A redispersable polymer composition comprising a polymer, said polymer containing silanol groups, said silanol groups being protected with at least one protective group, wherein said composition is in the form of a powder, said protective group comprises a hydroxy-containing compound, said hydroxy-containing compound comprises a polyol and wherein said polyol comprises polyvinyl alcohol or a polhydric alcohol in the form of trimethylolpropane, glycol, diethylene glycol, butane triol, pentane triol, hexane triol pentaerythriol, or mixtures thereof.

2. An aqueous system comprising water and the redispersable compound of claim 1.

* * * * *